Oct. 13, 1942.   C. S. JENNINGS   2,298,386
CONVEYER CHAIN
Filed Jan. 6, 1939
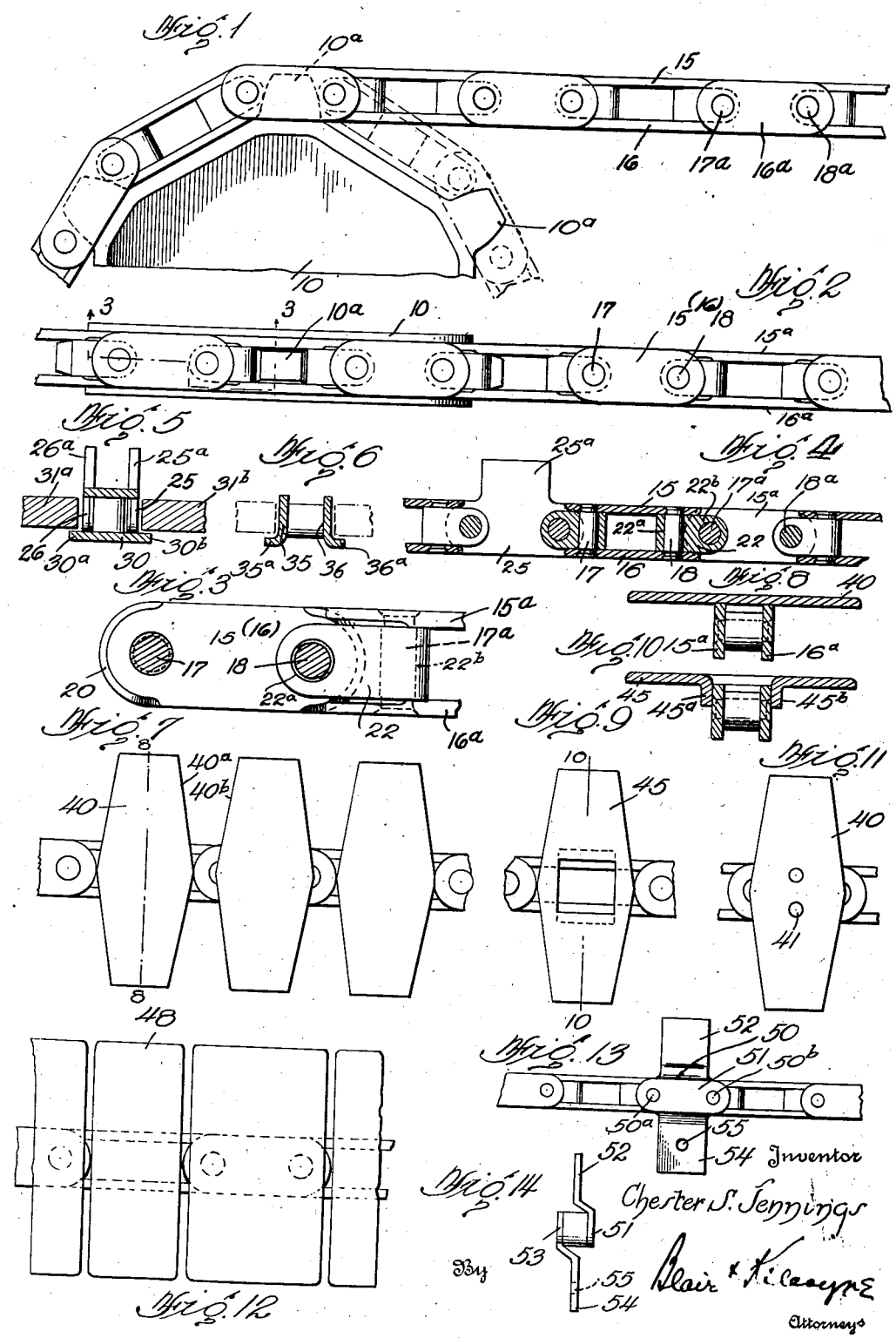
Inventor
Chester S. Jennings
By Blair & Kilcoyne
Attorneys Patented Oct. 13, 1942

2,298,386

UNITED STATES PATENT OFFICE 2,298,386

CONVEYER CHAIN

Chester S. Jennings, Syracuse, N. Y., assignor, by mesne assignments, to Lamson Corporation, De Witt, N. Y., a corporation of New York Application January 6, 1939, Serial No. 249,637

11 Claims. (Cl. 198—189)

This invention relates to conveyer chains and in its more specific aspects to an improved two-plane conveyer chain adapted to be driven or supported by sprockets whose axes are angularly related as in the case where the chain travels around both vertical and horizontal turns.

Among the objects of the present invention may be noted the provision of an improved conveyer chain which is characterized by simplicity in construction and design, which is durable and rugged in use, and which possesses a high degree of flexibility and adaptability in application; the provision of an improved two-plane conveyer chain; the provision of a two-plane conveyer chain in which article-pushing elements such as lugs may be incorporated as an integral part of any component link thereof; the provision of a two-plane conveyer chain in which hold-down means may be incorporated in one or more of the component links thereof, as desired; the provision of an improved article or work-carrying conveyer chain adapted to travel around vertical turns or around vertical and horizontal turns; the provision of an improved two-plane conveyer chain which may be employed in overhead conveyer sytems.

Other objects will be in part obvious and in part hereinafter pointed out in connection with the following analysis of this invention wherein is illustrated an embodiment of the invention in detail.

In the drawing—

Fig. 1 is a side elevation of a conveyer chain of the present invention with which is associated a drive sprocket, the dotted line illustration showing the manner in which the chain may travel around a reverse turn;

Fig. 2 is a plan view of the conveyer chain illustrated in Fig. 1;

Fig. 3 is an enlarged section taken along line 3—3 of Fig. 2;

Fig. 4 is a longitudinal section through a modified form of conveyer chain;

Fig. 5 is a vertical section taken transversely through a link of the Fig. 4 modification illustrating the preferred hold-down means;

Fig. 6 is a section through a link illustrating a modified form of hold-down means;

Fig. 7 is a plan view of conveyer chain in accordance with the present invention with which is associated article-carrying plates;

Fig. 8 is a section along line 8—8 of Fig. 7;

Fig. 9 is a detail illustrating a modified form of article-supporting or carrying plate;

Fig. 10 is a section along lines 10—10 of Fig. 9;

Fig. 11 is a detail illustrating a further modification of article-carrying or supporting plate;

Fig. 12 is a detail illustrating a form of article-carrying plate for use with a conveyer chain adapted to run straightway; that is, about vertical turns only;

Figs. 13 and 14 illustrate a modified chain link for use with an overhead conveyer system.

Referring now to the drawing wherein like reference characters designate like parts throughout the several views, Fig. 1 is illustrative of a stretch of a conveyer chain made up of a plurality of interconnected links constructed and arranged in accordance with the present invention, the chain being driven as by a six-tooth sprocket 10, of which the tooth 10a is driving the chain about a vertical turn through its driving connection with one of the links thereof. While in the Fig. 1 illustration the sprocket 10 is indicated as rotating on a horizontal axis, the figure may be regarded also as illustrative of the chain and sprocket arrangement in which the sprocket rotates on a vertical axis thus to drive or support the chain as it makes a horizontal turn.

Referring particularly to Figs. 1-3, each link of the chain is comprised by two flat faced link bars 15, 16 connected in spaced, parallel relation by transversely extending end pins 17, 18. The link bars are relatively elongated and their ends are formed semi-circular as illustrated more particularly in Fig. 3. Preferably, the inner corners of the curved bar ends are rounded or beveled as indicated at 20 whereby adjacent links may flex relatively to each other without binding or rubbing.

The pins 17, 18 are formed with reduced ends which extend through aligned, countersunk holes punched in the link bars. Accordingly shoulders are provided between the intermediate, large diameter portion of the pins and their reduced ends, against which the link bars engage when the bars and pins are properly related. To secure the so-related parts the ends of the pins may be turned over or otherwise deformed as by a riveting operation so that the metal of the pins flows into the countersunk openings. Hence the pins function to fixedly secure the link bars together in spaced, parallel relation. If necessary, the deformed pins ends are ground down or otherwise fashioned flush with the flat outer faces of the side bars.

Each of the pins 17, 18 further provides a pivot or axle which secures a connecting block 22 to the link, and on the axis of which the block may turn relatively to the link proper. The block is square in transverse section, its height and width being slightly less than the spacing between the side bars of a link and substantially less than the depth of the side bars, whereby it may be accommodated with slight clearance between the side bars of adjacent links connected thereby and whereby each block is further effectively enclosed within the square outline of the chain as represented by a section taken through the same at the interlocked ends of any pair of connected links. In longitudinal section the block is generally rectangular, its length being such that the block extends between a link and its next adjacent link and secures said links together in overlapped or longitudinally interlocked relation. Due to the uniform depth of the side bars of the overlapped links and their enclosure of the connector blocks as aforesaid, the top and bottom edges of the side bars of the vertically disposed links form in effect a continuation of the flat faces of the side bars of the intermediate horizontally disposed links. Accordingly a chain so constructed is provided on each of its four sides with a substantially continuous and smooth riding or bearing surface.

The opposed ends of the block, instead of being square, are machined or otherwise formed semi-cylindrical on axes which are turned 90°. The curved ends of the block thus provide arcuate noses against which the curved teeth of the driving sprocket may engage. Each end of the block is drilled along the axis of its curved nose, to provide two spaced holes 22a, 22b, which thus extend along axes which are turned at a 90° angle. The diameter of the holes 22a, 22b is slightly in excess of the diameter of the intermediate portion of the pins on which the block turns, whereby the connector block and links associated therewith may flex freely with relation to each other.

According to the present invention a link as described has connected to each of its ends, by connecting blocks as described, links which, by reason of the right angular relationship of the pin holes 22a, 22b, are of identical construction but which are turned bodily with reference thereto through an angle of 90°. Thus, if link bars 15, 16 of one link are horizontally arranged, the link bars 15a, 16a of the next adjacent link are vertically arranged. Similarly, the related pair of axes of pins 17a, 18a of the second or next adjacent link extend transversely to the related pair of axes of pins 17, 18 of the first link. It will be understood that connector block 22 which is carried by the end pin 18 of the first link is secured to said next adjacent link by the end pin 17a thereof which extends through hole 22b of the connector whereby the connector may turn on the vertical axis of pin 18 and the horizontal axis of pin 17a.

By such an arrangement each link may turn or flex about two axes. Thus the link made up of side bars 15, 16 and connecting block 22 may be turned together about the horizontal axis of pin 17a of the next adjacent link. Similarly, such first link may turn about the vertical axis of pin 18, the connector block in this instance being restrained against movement by its positioning between the link bars 15a, 16a.

Considering a chain made up of a plurality of links interconnected and arranged as in the foregoing, the connectors between links in conjunction with the link end pins provide a succession of pairs of parallel link-flexing axes about which the plurality of links may turn relative to adjacent links, said pairs of axes corresponding to the end pin axes of the interconnected links. Further, the axes of each pair thereof lie in the same plane which is at right angles to the plane containing the next adjacent pairs of axes.

The above-described link construction also provides in each link a tooth receiving space or recess defined by the inner faces of the link bars and the nose portions of the two connectors pivotally connected to that link. Thus, by the angular disposition of links, the tooth-receiving openings of alternate links open or face in one direction, and the openings or recesses of the intermediate links face in a direction at right angles thereto, and it will be appreciated that a chain so constructed is adapted to be driven by sprockets rotating on axes which have a right-angular relationship with each other. Thus if a first sprocket is adapted to drive or support the chain about a vertical turn, its teeth will engage in the openings of alternate links whose side bars are vertically arranged, with the spacing between alternate teeth being such that the intermediate links are accommodated between the teeth of the sprocket. On the other hand, the chain may be driven or supported in making a horizontal curve by a sprocket at the turn whose teeth engage in the openings of the intermediate links whose link bars are horizontally arranged. In the latter instance the teeth of the sprocket are spaced to accommodate the length of the alternate links. With all links, the center line of the tooth-receiving recesses thereof are spaced equi-distantly from the axes of the end pins extending thereacross. Thus, considering the link having side bars 15, 16 of Fig. 3, the center line of the tooth-receiving recess thereof is equi-distant from the axes of the link end pins 17, 18. Similarly, the center line of the next adjacent link recess is equi-distant from the axes of the end pins 17a, 18a thereof. Accordingly there is provided a two-plane chain which may be driven or supported by sprockets whose axes are arranged 90° to each other, and whose teeth are radial teeth. This latter feature is important from the standpoint of sprocket arrangement, particularly where reversal of chain movement is required.

The chain as above described represents a highly practical and effective plain drag chain giving smooth, continuous carrying and riding surfaces by reason of the longitudinal interlocking of the vertical and horizontal side bars of adjacent links. Inasmuch as all links are of like construction, with the chain being square in transverse section and thus symmetrical about the longitudinal axis thereof, work can be taken on one of the chain sides until worn. Thereupon the chain can be turned and work taken on any or all of the other three sides thereof until all four sides of the chain have worn, thus to provide a chain of exceedingly long life and extended service.

Where it is desired to employ a chain as described in a conveying system requiring that articles such as boxes, cans, or the like, be positively pushed along a path of travel, pusher lugs may be incorporated at spaced intervals along the length thereof as desired. As shown in Figs. 4 and 5, the pusher lugs may be formed as an integral part of a particular link or links, and one such arrangement is illustrated in the drawing. To this end a pair of vertically disposed side bars such as the side bars 25, 26 of a designated link have integral projections 25a, 26a extending upwardly therefrom a substantial distance above their normal top edge. Otherwise the link construction and the manner in which it is related to adjacent links is as above described. The projections 25a, 26a provide lugs which are adapted to engage articles supported on or above the chain, such as boxes, cans, or the like, and to propel them forwardly with the chain from a supply station to an unloading station. As the lugs 25a, 26a are provided on links whose link-bars are vertically disposed, thus to cooperate with the teeth of a sprocket turning about a horizontal axis, it will be appreciated that such articles may be conveyed along a path which makes horizontal turns, and that the lugs 25a, 26a do not interfere with the sprocket action or drive.

With chains of the character under description, it is sometimes necessary to provide hold-down means whereby whipping of the chain or movement thereof vertically is prevented. To this end certain of the links whose link bars are horizontally arranged may be provided with hold-down lugs adapted to be cooperated with by a hold-down bar. Such an arrangement is indicated in Fig. 5, in which a bottom link-bar 30 is extended laterally to provide hold-down lugs 30a, 30b. Hold-down bars 31a, 31b may be arranged directly over the hold-down lugs 30a, 30b and engage said lugs upon any tendency of the chain to lift or whip vertically.

In Fig. 6 there is illustrated a modified form of hold-down link whose link bars are arranged vertically. In such a modified construction the lower portions of the vertical link bars 35, 36 of a selected link (which bars may be formed extra deep) are bent or turned outwardly at right angles to the link bars proper to provide lateral projections or lugs 35a, 36a, for cooperation with hold-down bars positioned as above.

For certain installations it is desirable that a conveyer chain provide a support for articles, such as bottles and the like, which cannot be conveyed in practical manner by the pusher type chain above described. To meet the requirements of such an installation, a chain as described has secured thereto a plurality of load or article-carrying plates as indicated in Fig. 7. Preferably the top plates 40 are each secured directly to the upper edge or top surface of a link. As illustrated in Fig. 8, the plates 40 may be secured to alternate links whose link-bars are vertically disposed as by welding directly to the top edges of the link bars (such as 15a, 16a). The intermediate top plate 40 of the Fig. 7 illustration, which is carried by a link whose link-bars are horizontally disposed, can be secured flush on the upper surface of the upper link bar as by welding.

In order that a chain provided with load or article-carrying plates as aforesaid may make a horizontal turn of relatively small radius, the vertical transverse edges of adjacent plates are inclined away from each other as indicated at 40a, 40b, whereby adjacent plates may turn through a substantial angle relatively to each other.

In Figs. 9 and 10 is illustrated a modified form of connection between the load or article-carrying plates and links whose link-bars are vertically arranged. Such an article-carrying plate 45, instead of being solid throughout as in the Fig. 7 construction, is provided with a central rectangular opening formed by punching or slitting the plate substantially in the form of an H, the tongue portions 45a, 45b being thereupon bent downwardly to extend flush with the outer faces of the vertically disposed link bars, such as 15a, 16a, connection between the plate tongues and link side bars being effected as by welding or riveting.

Alternately, plates 40 as in the Fig. 7 construction may be secured by rivets 41 to the top link bars of links whose link-bars are horizontally arranged, this arrangement being indicated in Fig. 11.

For some installations it is desirable to convey articles with a chain provided with article-supporting plates as in the Fig. 7 construction but only throughout a straightway path. Where such is contemplated the load or article-carrying plates 48 may be formed rectangular, as in the Fig. 12 illustration, with the chain being accordingly susceptible to movement around vertical turns only.

The two-plane chain construction as described in the foregoing is also applicable for use in overhead conveyer systems by constituting certain links thereof as trolley and and hanger links, the distance between such links depending upon the service requirements of a particular overhead installation. Referring to Figs. 13 and 14, wherein a trolley and hanger link for a two-plane overhead conveyer chain constructed as aforesaid is illustrated, reference character 50 designates a chain link whose link bars are vertically disposed, the link being connected by pins 50a, 50b to adjacent links whose side bars are horizontally disposed, and flexing with relation to said adjacent links about two axes. One side bar 51 has an upwardly projecting attachment extension 52 formed integrally therewith, the extension being turned inwardly to lie substantially in the vertical plane of the longitudinal center line of the link. The other side bar 53 has an integral attachment extension 54 projecting downwardly therefrom, also teurned inwardly to lie in the plane of the extension 52. The latter extension may be provided with a through hole 55, by which hanger hooks or equivalent work-carrying elements may be secured to the link. The upper extension 52 provides an attaching surface to which may be secured in suitable manner a trolley roller mounting. It will accordingly be recognized that the chain link design and construction as described lends itself readily to use as an overhead conveyer chain in addition to the other uses and applications referred to in the preceding description.

The advantages and universality of a conveyer chain constructed in accordance with the foregoing will be obvious. In addition to its simplicity of design and rugged nature, as well as the ease with which pusher lugs, hold-down lugs, article-carrying plates, and trolley and hanger links may be incorporated therewith, the chain may travel around both vertical and horizontal curves, the link construction being such that idlers or drive sprockets may be placed on the horizontal curves for easing the chain therearound. The use of idling or drive sprockets on the horizontal turn is advantageous in that the chain is automatically held down in proper position thereby as it makes the turn, without the use of extraneous hold-down means at this location.

As many changes could be made in carrying out the above construction without departing from the scope of the invention, it is intended that all matter contained in the above description or shown in the accompanying drawing shall be interpreted as illustrative and not in a limiting sense.

I claim:

1. A two-plane conveyer chain comprising a plurality of links, each constituted by side bars having relatively outer faces and longitudinal edges adapted with the faces or edges adjacent link side bars to provide a substantially continuous bearing surface for the chain and transversely extending end pins securing the side bars in spaced parallel relation, and connectors extending between the related end pins of adjacent links and connecting the links in end-to-end relationship, said connectors forming with the inner faces of the link side bars a sprocket tooth-receiving recess in each link and being constructed and arranged as to dispose each link and the recess thereof at right angles to the next adjacent links and recesses thereof and to provide with the link end pins a succession of right-angularly related pairs of parallel link-flexing axes which correspond to the end pin axes of the interconneced links, and the center line of each tooth-receiving recess of a link being equi-distantly spaced from the axes of the end pins thereof.

2. A two-plane conveyer chain comprising a plurality of links, each constituted by side bars having relatively outer faces and longitudinal edges adapted with the faces or edges of adjacent link side bars to provide a substantially continuous bearing surface for the chain and transversely extending end pins securing the side bars in spaced, parallel relation, and connector blocks disposed between links for connecting said links in end-to-end relationship and forming with the relatively inner faces of the link side bars a sprocket tooth-receiving recess in each link, said connector blocks being each provided with two right angularly related pin holes through which extend the related end pins of adjacent links, whereby said blocks dispose each of said links and the recess thereof at right angles to the next adjacent links and the recesses thereof and provide with said end pins a succession of right angularly related pairs of parallel link flexing axes which correspond to the end pin axes of the interconnected links, the center line of each tooth-receiving recess of a link being equi-distantly spaced from the axes of the end pins thereof.

3. A two-plane conveyer chain comprising a plurality of links, each constituted by relatively elongated side bars having relatively outer faces and longitudinal edges adapted with the faces or edges of adjacent link side bars to provide a substantially continuous bearing surface for the chain and having their opposite ends curved and transversely extending end pins securing the side bars in spaced, parallel relation, and connector blocks disposed between links for connecting said links in end-to-end relationship and forming with the relatively inner faces of the link side bars a sprocket tooth-receiving recess in each link, said connector blocks being each provided with two right angularly related pin holes through which extend the related end pins of adjacent links, whereby said blocks dispose each of said links and the recess thereof at right angles to the next adjacent links and the recesses thereof and provide with said end pins a succession of right-angularly related pairs of parallel link flexing axes which correspond to the end pin axes of the interconnected links, the center line of each tooth-receiving recess of a link being equi-distantly spaced from the axes of the end pins thereof, and said connector blocks being each so dimensioned transversely as to be wholly enclosed within the symmetrical outline of adjacent links connected thereby, the longitudinal spacing between the pin holes of each block being such that said each block effects limited overlapping of the adjacent links connected thereby.

4. A two-plane conveyer chain comprising a plurality of links, each constituted by relatively elongated and straight-edged side bars having flat outer faces adapted with the straight edges of adjacent link side bars to provide substantially continuous carrying or bearing surfaces as required, and transverse end pins securing the side bars in spaced, parallel relation, and connectors extending between the related end pins of adjacent links for connecting the links in end-to-end relationship and for forming with the inner faces of the link side bars a sprocket tooth-receiving recess in each link, said connectors being constructed and arranged as to dispose each link and the recess thereof at right angles to the next adjacent links and recesses thereof and to provide with said end pins a succession of right angularly related pairs of parallel link-flexing axes which correspond to the end pin axes of the interconnected links, the center line of each tooth-receiving recess of a link being equi-distantly spaced from the end pin axes thereof.

5. A two-plane conveyer chain comprising a plurality of links, each constituted by relatively elongated and straight-edged side bars having curved ends and flat outer faces adapted with the straight edges of adjacent link side bars to provide substantially continuous carrying or bearing surfaces as required, and transverse end pins securing said side bars in spaced, parallel relation, and connectors extending between the related end pins of adjacent links for connecting the links in end-to-end relationship and for forming with the inner faces of the link side bars a sprocket tooth-receiving recess in each link, said connectors being constructed and arranged as to dispose the side bars and recesses of alternate links horizontally and the side bars and recesses of the intermediate links vertically and to provide a succession of pairs of vertical and horizontal link-flexing axes corresponding to the end pin axes of the interconnected links, with the center line of each tooth-receiving recess being equi-distantly spaced from the end pin axes of the link, and said connectors being dimensioned transversely with reference to the depth of the link side bars and longitudinally with reference to links connected thereby as to provide a chain which is symmetrical in transverse section and in which the curved ends of the angularly related side bars of adjacent links are overlapped longitudinally.

6. A two-plane conveyer chain comprising a plurality of links, each constituted by relatively elongated and straight-edged side bars having flat outer faces and transverse end pins connecting said side bars in spaced, parallel relation and connectors extending between the related end pins of adjacent links for connecting the links in end-to-end relationship, said connectors forming with the inner faces of the link bars a sprocket tooth-receiving recess in each link and being constructed and arranged as to dispose the side bars and recesses of alternate links horizontally and the side bars and recesses of intermediate links vertically and to provide a succession of pairs of vertical and horizontal link-flexing axes corresponding to the end pin axes of the interconnected links, the depth of the link side bars being such that the angularly related side bars of the adjacent links effectively enclose the connectors extending therebetween and that the straight edges of the vertically disposed side bars form a continuation of the flat outer faces of the horizontally disposed side bars thereby to provide a symmetrical chain capable of taking wear on any one or all of its four sides.

7. A two-plane conveyer chain comprising links constituted by horizontal side bars secured in spaced, parallel relation by end pins providing a pair of vertical link-flexing axes, alternating with links constituted by vertical side bars secured in spaced, parallel relation by end pins providing a pair of horizontal link-flexing axes, and connectors extending between the angularly related end pins of adjacent links for securing said links in end-to-end relationship, all said link side bars being straight-edged and of uniform length and depth and having flat outer faces providing carrying or bearing surfaces as required, and said connectors cooperating with said links to form a chain in which the straight edges of the vertically disposed link bars form a continuation of the flat faces of the horizontally disposed link bars, whereby the chain has symmetrical outline and can be turned to take wear on all four sides.

8. A two-plane conveyer chain comprising links constituted by horizontal side bars secured in spaced, parallel relation by end pins providing a pair of vertical link-flexing axes, alternating with links constituted by vertical side bars secured in spaced, parallel relation by end pins providing a pair of horizontal link-flexing axes, and connectors extending between the angularly related end pins of adjacent links for securing said links in end-to-end relationship, the link bars of all links being straight-edged and of uniform length and depth and being formed with curved ends and flat outer faces providing carrying or bearing surfaces as required, and the connectors being dimensioned transversely with reference to the depth of the link bars and longitudinally with reference to links connected thereby as to provide a chain in which the straight edges of the vertically disposed link bars form a continuation of the flat faces of the horizontally disposed link bars and in which the curved ends of the angularly related side bars of adjacent links are overlapped longitudinally.

9. A two-plane conveyer chain comprising horizontal links constituted by horizontal side bars secured in spaced, parallel relation by end pins providing a pair of vertical link-flexing axes, alternating with vertical links constituted by vertical side bars secured in spaced parallel relation by end pins providing a pair of horizontal link-flexing axes, and connectors extending between the angularly related end pins of adjacent links for securing said links in end-to-end relationship, the lower edges of the side bars of the vertically disposed links and the relatively outer faces of the under side bars of the horizontally disposed links being arranged to form a substantially continuous bearing surface for the chain and the side bars of certain of the vertical links being extended above the upper chain surface to provide pusher lugs.

10. A two-plane conveyer chain comprising horizontal links constituted by horizontal side bars secured in spaced, parallel relation by end pins providing a pair of vertical link-flexing axes, alternating with vertical links constituted by vertical side bars secured in spaced, parallel relation by end pins providing a pair of horizontal link-flexing axes, and connectors extending between the angularly related end pins of adjacent links for securing said links in end-to-end relationship, the lower edges of the side bars of the vertically disposed links and the relatively outer faces of the under side bars of the horizontally disposed links being arranged to form a substantially continuous bearing surface for the chain, and the side bars of certain of said links being extended beyond the chain sides for cooperation with hold-down means disposed along the path of chain travel.

11. A two-plane conveyer chain comprising horizontal links constituted by horizontal side bars secured in spaced, parallel relation by end pins providing a pair of vertical link-flexing axes, alternating with vertical links constituted by vertical side bars secured in spaced, parallel relation by end pins providing a pair of horizontal link-flexing axes, and connectors extending between the angularly related end pins of adjacent links for securing said links in end-to-end relationship, the lower edges of the side bars of the vertically disposed links and the relatively outer faces of the under side bars of the horizontally disposed links being arranged to form a substantially continuous bearing surface for the chain, the under side bars of certain of the horizontally disposed links being extended beyond the chain sides for cooperation with hold-down means disposed along the path of chain travel.

CHESTER S. JENNINGS.